Figure 1:
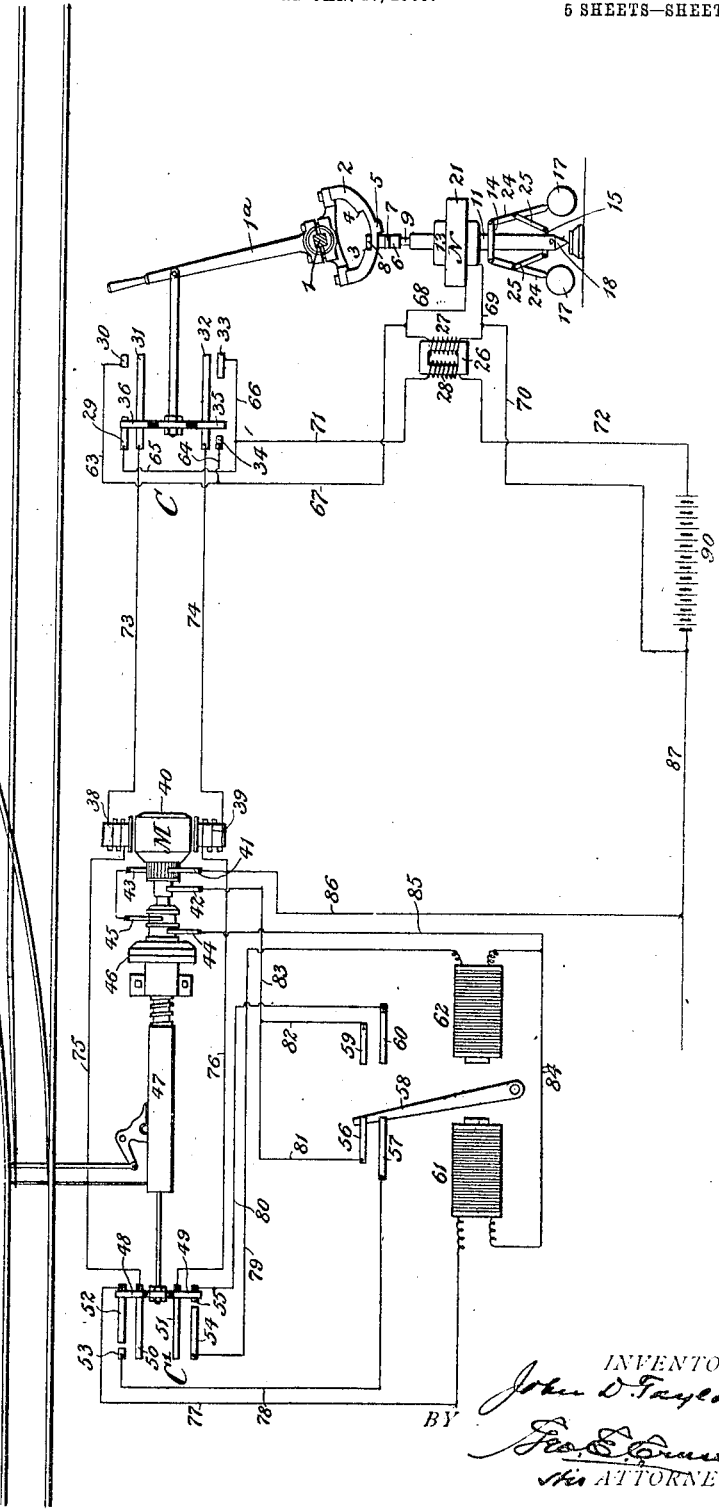

No. 892,770. PATENTED JULY 7, 1908.
J. D. TAYLOR.
APPARATUS FOR GOVERNING THE PASSAGE OF CARS OR VEHICLES ALONG A RAILWAY.
APPLICATION FILED JAN. 17, 1905.

5 SHEETS—SHEET 1.

WITNESSES:

INVENTOR.
John D. Taylor
BY
His ATTORNEY.

No. 892,770. PATENTED JULY 7, 1908.
J. D. TAYLOR.
APPARATUS FOR GOVERNING THE PASSAGE OF CARS OR VEHICLES ALONG A RAILWAY.
APPLICATION FILED JAN. 17, 1905.

5 SHEETS—SHEET 2.

WITNESSES:
INVENTOR.
John D. Taylor
BY Geo. E. Cruse
His ATTORNEY.

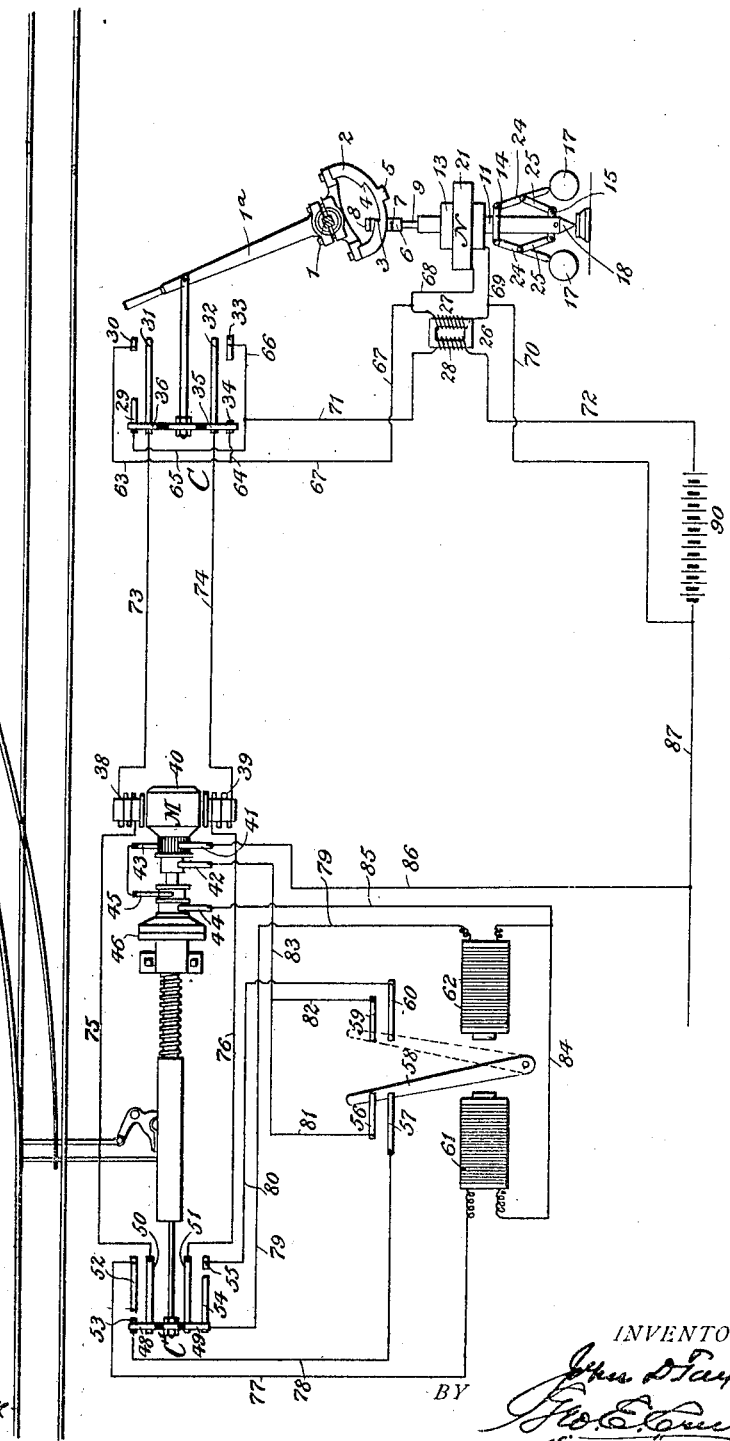

No. 892,770. PATENTED JULY 7, 1908.
J. D. TAYLOR.
APPARATUS FOR GOVERNING THE PASSAGE OF CARS OR VEHICLES ALONG A RAILWAY.
APPLICATION FILED JAN. 17, 1905.
5 SHEETS—SHEET 4.
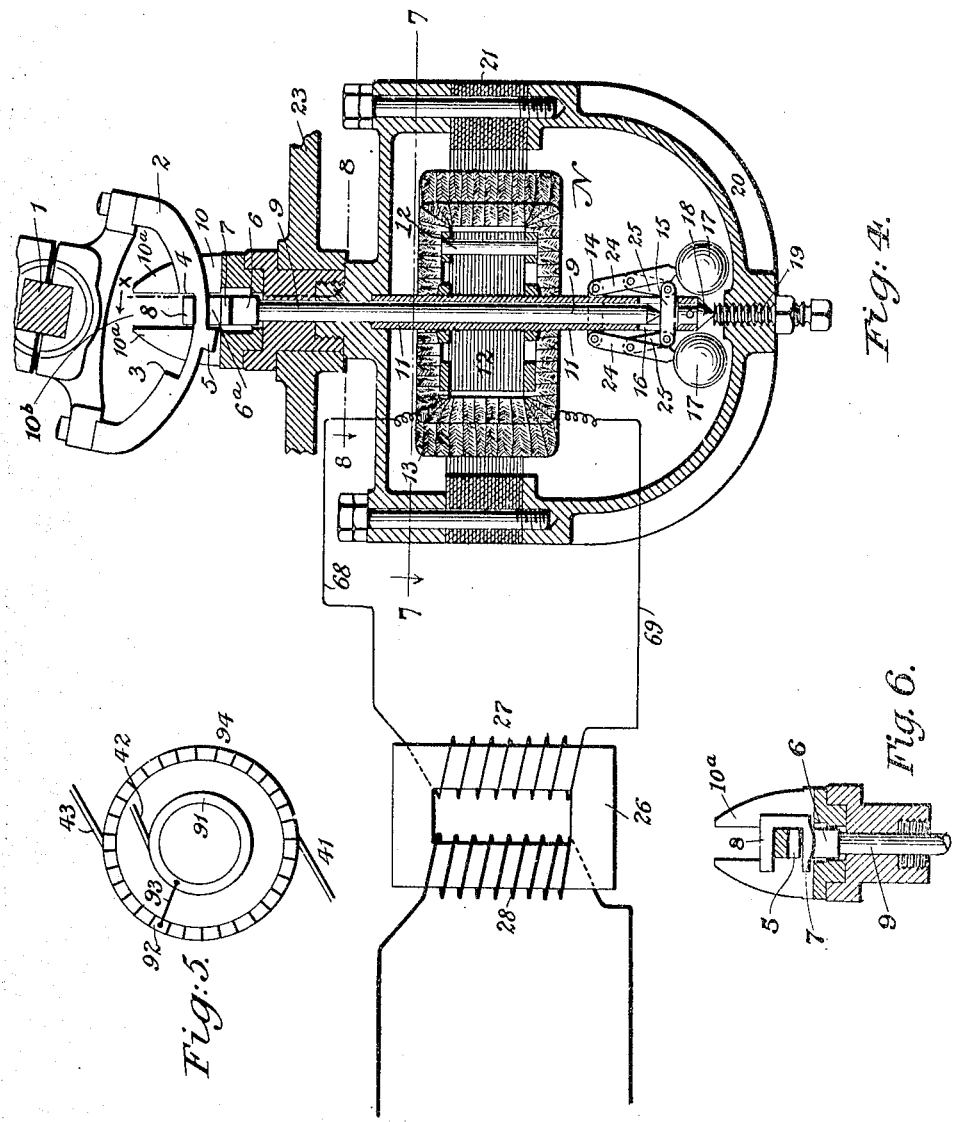
WITNESSES:
INVENTOR.

No. 892,770. PATENTED JULY 7, 1908.
J. D. TAYLOR.
APPARATUS FOR GOVERNING THE PASSAGE OF CARS OR VEHICLES ALONG A RAILWAY.
APPLICATION FILED JAN. 17, 1905.
5 SHEETS—SHEET 5.
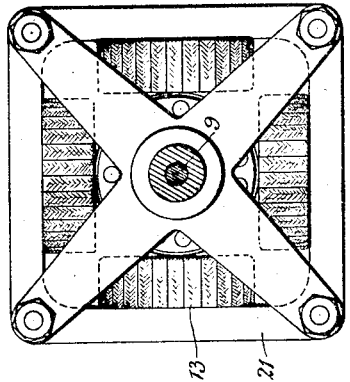
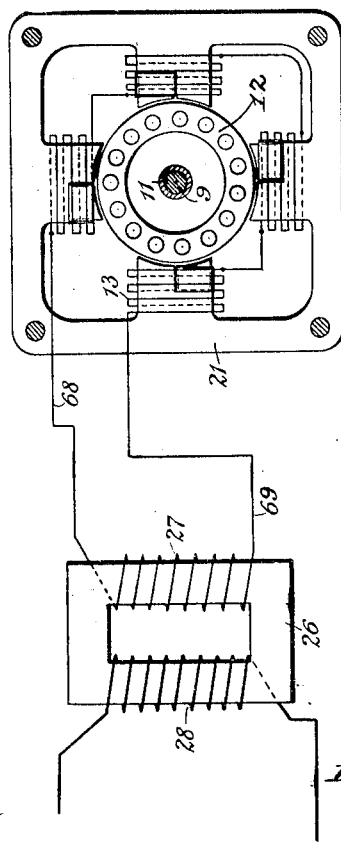
Witnesses:
Inventor:
John D. Taylor
his Attorney.

UNITED STATES PATENT OFFICE.

JOHN D. TAYLOR, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

APPARATUS FOR GOVERNING THE PASSAGE OF CARS OR VEHICLES ALONG A RAILWAY.

No. 892,770.    Specification of Letters Patent.    Patented July 7, 1908.

Application filed January 17, 1905. Serial No. 241,473.

*To all whom it may concern:*

Be it known that I, JOHN D. TAYLOR, a citizen of the United States, residing at Wilkinsburg, in the county of Allegheny and State of Pennsylvania, have invented certain new and useful Improvements Relating to Apparatus for Governing the Passage of Cars or Vehicles Along a Railway, of which the following is a specification.

My invention relates to apparatus for governing the passage of cars or vehicles along a railway.

My invention has special reference to apparatus intended for operating railway switches for which electricity is employed as the motive power, as well as for actuating "indication mechanism" usually employed in connection with such apparatus. The supply of current thereto is controlled by circuit controllers operated from levers comprised in what is generally known as an "interlocking machine" which is generally arranged within a cabin or tower located at a distance from the switch operating apparatus. Each lever on these machines is usually provided with mechanism known in the art as "indicating mechanism" such mechanism being actuated to release its lever, whereby the lever is permitted to be moved to its final position, and to release, through what is known as "mechanical interlocking", similar levers which may control other apparatus for operating signal devices or other switch rails. The "indicating mechanism" when so actuated indicates that the apparatus controlled from the circuit controller and lever has operated in response to a movement of the circuit controller and lever.

I will describe an apparatus, comprising an electric motor for moving the switch rail or rails, and also a control therefor, embodying my invention and then point out the novel features thereof in claims. My invention may also be used in connection with apparatus for operating signal devices comprising an electric motor the supply of current to which is under the control of a lever, and the lever provided with an indicating mechanism. The signal device and the switch rails so far as my invention is concerned are equivalent devices as each controls in its way the passage of cars or vehicles along a railway.

The accompanying drawings show diagrammatically certain devices comprising an electric motor, a source of current supply for said motor, a circuit controller and lever for controlling the supply of current to said motor; an indicating mechanism for the lever comprising a latch, and electro-magnetic means for operating said latch, said electro-magnetic means comprising a rotating part which, upon rotation operates the latch to release the circuit controller and lever, and a source of current supply for said electro-magnetic means. The said drawings further show diagrammatically certain devices comprising an electric motor, a source of current supply for said motor, a circuit controller and lever for controlling the supply of current to said motor, an indicating mechanism for the lever comprising a latch, said electro-magnetic means for operating said latch, said electro-magnetic means comprising a rotating part which, upon rotation, operates the latch to release the circuit controller and lever, and means for supplying said electro-magnetic means with an alternating current.

I have not deemed it necessary to illustrate the various adjuncts connected to, or forming part of, the "interlocking machine" but have simply shown a circuit controller and lever usually employed for controlling the movements of the switch rail or rails, and have also confined myself to illustrating, diagrammatically, a mechanical switch and lock movement which is here shown as comprising a screw for moving it from one position to the other, an electro-magnetic clutch and an ordinary motor for giving rotation to said screw, the latter being geared to and connected up with the motor through the medium of the electro-magnetic clutch. This is illustrated and described in my co-pending application filed April 18th, 1904, Serial No. 203,645. This switch movement is arbitrarily chosen solely for the purpose of illustrating and explaining the essential features of my invention.

An object of the present invention is the provision of means whereby a unidirectional current is made to produce an alternating current for effecting the operation of the indication mechanism, the latter being so constructed and arranged as to remain unaffected by a unidirectional current or by accidental impulses of current, which may flow through it, due wholly or partially to the making and breaking of contact between the conductor wires of the system.

Figure 2:
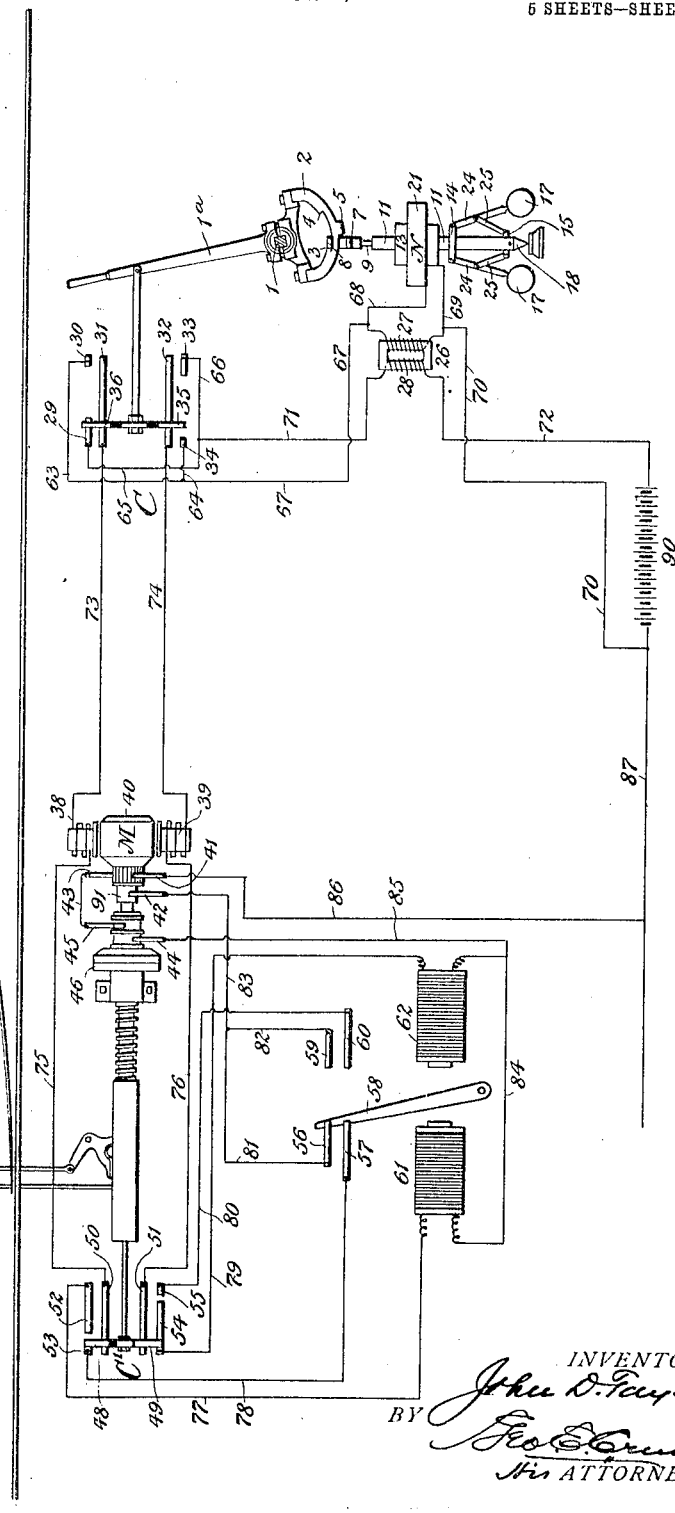

In the drawings, Figure 1 is a diagrammatical view of a portion of a railway, switch rails, an apparatus for moving the switch rails, a control lever, indicating mechanism therefor and an arrangement of circuits and the necessary apparatus included therein between the lever and apparatus, and embodying my invention. Fig. 2 is a view similar to Fig. 1 but showing a different condition of the circuits and apparatus. Fig. 3 is a view similar to Figs. 1 and 2 but showing a different condition of the circuits and apparatus. Fig. 4 is a view partly in elevation and partly in vertical section of an indicating mechanism embodying my invention. Fig. 5 is a detail diagrammatical view of the motor armature and an attachment. Fig. 6 is a detail sectional view taken on the line x—x of Fig. 4. Fig. 7 is a detail view partly in horizontal section, the section being taken on line 7—7 of Fig. 4. Fig. 8 is a detail horizontal sectional view, the section being taken on line 8—8 of Fig. 4.

Similar reference numerals indicate corresponding parts in all the figures of the drawings.

Referring to said drawings: 1, designates one of a number of shafts which are comprised in an interlocking machine, to which is rigidly secured a handle 1ª (shown in Figs. 1, 2 and 3) and which is generally termed a "lever." The shaft 1 is made to turn about its axis by a manipulation back and forth of the handle 1ª and the latter has the usual preliminary and final movements. The preliminary movement is to lock through mechanical locking certain other levers and to operate a circuit controller thereby affecting certain circuits controlled thereby, and the final movement is to again operate the circuit controller to affect certain circuits and to release certain other levers. This is well known in the art and need not be described. The final movement of any lever in either direction is prevented as usual by the "indicating mechanism" in a manner well understood. Instead of levers for operating the circuit controllers, push buttons or other equivalent devices may be used.

An indicating mechanism embodying my invention and which is preferably employed, is illustrated in Figs. 4, 5, 7 and 8. It comprises an alternating current motor, the armature of which upon rotation operates the locking means for the lever. The alternating current motor illustrated is of a well known type and comprises a squirrel cage armature 12, and a laminated field piece or stator 21, which, in the one herein shown, has inwardly projecting poles, one half of each pole being shaded by a copper band for producing a starting couple or "torque" when energized by a single phase alternating current. This motor may, of course, be constructed differently as may be found desirable. It must not, however constructed, be affected by unidirectional current, nor by current impulses due to the intermittent contact between the wires of the system.

The armature 12, is suitably mounted on a hollow shaft 11, the lower end of which is provided with a cone plug 18, which rests upon, and is supported by, a step or bearing 19, adjustably held within a socket provided in the frame 20. The tubular shaft 11, near its lower end, is provided with oppositely-disposed parallel slots 16, for the reception of a bar 15, and the outer ends of this bar have pivotally secured to them short links 25, which in turn are pivoted to levers 24, each of the latter being pivotally supported at one end by the hollow shaft 11, and being provided at their free ends with balls or weights 17. This construction is similar in many respects to the ordinary governors, employed in connection with steam and other engines, and is adapted in the present instance to lift the bar 15, in the slot 16, when the balls or weights 17 move outwardly by centrifugal force, due to the rotation of the motor shaft. A mechanism of this kind is known as a centrifuge and it will be understood that wherever I herein use the term "centrifuge" I mean a device which, upon rotation is made to perform work, that is, to lift or raise the latch. Any device acting in this manner may be used. It will, therefore, be seen that the rotation of the armature must be continued for some period, that is, until the centrifuge has been given sufficient momentum to operate the latch. This is in itself a factor of safety in the apparatus.

The latch or locking device for the lever is here shown as comprising a shaft 9, which fits within the hollow shaft 11, its lower end resting upon and being supported by the bar 15, while its upper end 6 is provided with an open slot 6ª formed between two lugs 7 and 8, and between which a segmental extension 2 of the lever 1ª moves, during the operation of controlling the movement of the switch or signal. A guide block 10 serves the purpose, not only of guiding the segmental extension 2 in its movement, but also of guarding the latch 6 against rotation.

It will be apparent by reference to Figs. 4 and 6, that the face of the segmental extension 2 will work between the fingers or uprights 10ª, while the lugs 7 and 8 of the latch 6 will work within a slot 10ᵇ of which the edge of said fingers or uprights form the walls. The segmental extension 2 is recessed and the ends of this recess form shoulders 3 and 4 against which the lug 8 on the rod 9 abuts, thereby limiting the movement of the lever 1 in either direction. When the parts are in the position shown in Fig. 4, it will be apparent that the lever may be moved to the left, which constitutes the preliminary movement in that direction, and when such preliminary movement of the lever has been affected the parts will be in the position shown in Fig. 1, (which may be termed the commencement of the normal movement). The preliminary movement operates a circuit controller C which may be of any desired construction so that current from a battery 90 or other suitable source of supply will flow through wire 72, primary coil 28, of a transformer or other analogous device 26, wires 71, 65, contacts 29, 36, 31 (of the circuit controller), wire 73, field coil 38, of the switch operating motor M, wire 75, contacts 50, 48, 52, (of a suitable form of circuit controller C¹ which is operated by the switch and lock movement), wire 77, magnet 61, wires 84, 85, brush 44, electro-magnetic clutch 46, brushes 45, 43, armature 40, of the switch operating motor, thence through brush 41, wires 86, and 87, back to battery 90. The current flowing in this circuit causes the armature 40 to rotate and through the electro-magnetic clutch 46, which is energized by said current, the switch rails are moved from their "reverse" position to their "normal" position. While such current flows through the coils of the magnet 61, it has no effect whatever on the electro-magnetic controller, of which said magnet 61, forms a part, except to hold the contact 58, (also forming a part of the electro-magnetic controller,) in the position shown.

The current just described being unidirectional and practically of uniform strength while it passes through the primary coil 28 of the transformer 26, it will have no appreciable effect upon the secondary coil 27, so that the electro-magnetic controlling apparatus of the indicating mechanism cannot be energized to produce rotation.

When the switch and lock movement has operated to move the switch rails to full "normal" position as shown in Fig. 2, the circuit just described will be broken and a new circuit established, by reason of the shifting of the contact 48 of circuit controller C¹ from the contact 52 onto the contact 53. In the new circuit established, current will flow from the battery 90 through wire 72, primary coil 28, wires 71, 65, contacts 29, 36, 31, wire 73, field coil 38 of switch operating motor M, along wire 75, contacts 50, 48 and 53, wire 78, contacts 57, 58 and 56, wires 81, 83, brush 42, thence through a collector ring 91 to be described, through the motor armature 40, brush 41, (or directly to the brush 41 itself) and wires 86, 87, back to battery 90. It will be observed that the clutch coil 46 is not included in this last named circuit. Therefore, the clutch is not energized and the motor runs free.

The brush 42, is adjusted with relation to what I call a "collector ring" 91 (see Fig. 5) which is arranged on the armature shaft adjacent the commutator 94 and properly insulated from said shaft in any usual or suitable manner. One segment of the commutator, designated 92, is electrically connected with said collector ring 91 by means of a wire or bolt 93 and through the medium of the brush 42, said ring is in electrical connection with the outside circuit. When the segment 92 is in contact with the brush 41, the current will not pass through any of the coils of armature 40, but when the segment 92, is diametrically opposite said brush 41, the current will have two equal paths through the armature 40, to the brush 41. As the segment 92, approaches the brush 41, the resistance of the combined paths through the armature 40, decreases, and relatively increases as the segment 92, recedes from the brush 41. At such time or times as the segment 92, is opposite the brush 41, (that is, when it is at its furthermost point away from said brush), nearly the entire electro-motive force of the battery 90, in the circuit just described, is expended in the armature 40, resulting in imparting rotation to the said armature 40. But when, however, the segment 92 is in actual contact with the brush 41, nearly, if not quite, all the electro-motive force of the battery 90 will be expended in the coil 28, resulting in increased magnetization in the core 26. The regular recurrence alternately of the conditions above mentioned produce what may properly be termed a pulsating or undulating current in the coil 28, the pulsations or undulations of which are regular. This undulating current in the coil 28 similarly impresses undulating magnetism in the core 26, and results through the undulating magnetism of the core 26 in producing an alternating current in the secondary coil 27, which energizes the coil 13, of the indication motor. The current thus produced will cause the armature 12, of the indication motor N to rotate and, as such rotation continues and increases, the balls 17 will move outwardly by centrifugal force, moving the connecting links 25 and bar 15, outwardly and upwardly, thereby lifting the latch 6, releasing the lever 1, and permitting of a final movement thereof, as shown in Fig. 3. It is only by a steady rotation of the armature that the centrifuge will be made to act to release the latch. Wherever I use the term "rotation" I mean such continued rotation as would be sufficient to cause a rotation of the centrifuge or other equivalent device to act upon the latch. This final movement of the lever establishes a new circuit, (see Fig. 3), in which current will flow from the battery 90, through wire 72, primary coil 28, wires 71 and 65, contacts 29, 36 and 31, wire 73, field coil 38 of the switch operating motor M, wire 75, contacts 50, 48 and 52, wire 78, contacts 57, 58 and 56, thence through wires 81 and 83, brush 42, armature 40, brushes 43 and 45, clutch 46, brush 44, wire 85, magnet 62, wire 79, contacts 54, 49 and 51, wire 76, field coil 39, of said switch operating motor, along wire 74, contacts 32, 25 and 34, wires 64, 67, thence through indication motor coil 13, of the indication motor N, and secondary coil 27, of transformer, in parallel, and finally through wire 70, back to battery 90. The magnet 62, will of course, be energized, causing it to attract or withdraw the contact 58, from the contacts 56, 57 (as shown in dotted lines Fig. 3) thus breaking the circuit just described, as well as those circuits which affect the operating and indication mechanism. As this last named current is unidirectional, although pulsating or undulating, it produces the same effect on electro-magnets in the circuit as a uniform current. Hence its action on the magnet 62 mentioned above. In passing through the coil 13 of the indication motor it instantly stops the rotation of the armature 12, this being a case of a closed coil in a magnetic field, the copper bars of the armature 12 forming the closed coil and the unidirectional current in the coil 13 producing the magnetic field.

The lug 5 serves the purpose of preventing the movement of lever from one operating position to the other unless the latch 8 drops into a position to place the lug 8 in the path of the shoulders 3 and 4.

The circuits for moving the switch back to "reverse" position are practically similar to those just described and that for giving reverse movement to the switch operating motor may be traced by assuming that the contact 35 has been moved to bring it into engagement with the contacts 32 and 33 and the contact 36 adjacent the contacts 30, 31, preparatory to actual engagement upon final movement of the lever. With the contacts 35, 32 and 33 in engagement current from the battery 90 will flow through wire 72, primary coil 28, wires 73 and 66, contacts 33, 35, 32, along wire 74, through field 39, wire 76, contacts 51, 49 and 54, wire 79, magnet 62, wire 85, brush 44, clutch 46, brushes 45, 43, and 41, wires 86 and 87 back to battery.

The current last above described which affects the "reverse" movement of the switch rails, flows through the magnet 62, and in doing so causes the contact 58 to be put into the position shown in dotted lines in Fig. 3, if it had not been fully so placed by the final current of the previous movement, in which position it will engage the contacts 59 and 60 preparatory to establishing the reverse indication circuit.

To those skilled in the art to which this invention appertains, it will be apparent that the magnets 61 and 62 herein described, could be dispensed with by providing means for breaking the operating circuit in the cabin coincident with and by the final movement of the lever, but I prefer the arrangement herein shown, wherein the operating wire is left in connection with the battery in the cabin, and to break the circuit at the switch motor. It will also be apparent to those skilled in the art that the form of electric motor for operating the apparatus for moving the switch rails or signal devices is immaterial. In the event that some other form of electric motor is used to move the signal device or switch rail, a form of motor having a commutator such as illustrated in Fig. 5 would be used for indication purposes and would be included in the operating circuit at the proper time.

Having thus described my invention, what I claim is:

1. In combination with an apparatus comprising an electric motor for moving a part or appliance controlling the passage of cars or vehicles along a railroad, a source of current supply for said motor, means for controlling the supply of current to said motor, an indication mechanism for said controlling means, comprising a locking member and electro-magnetic means for operating the locking member, said electro-magnetic means comprising a rotating part which upon rotation operates the locking member to release the controlling means, and a source of current supply for said electro-magnetic means.

2. In combination with an apparatus comprising an electric motor for moving a part or appliance controlling the passage of cars or vehicles along a railroad, a source of current supply for said motor, a lever for controlling the supply of current to said motor, an indication mechanism for the lever comprising a latch and electro-magnetic means for operating said latch, said electro-magnetic means comprising a rotating part which upon rotation operates the latch, and a source of current supply for said electro-magnetic means.

3. In combination with an apparatus comprising an electric motor for moving a part or appliance controlling the passage of cars or vehicles along a railroad, a collector ring electrically connected with a segment of the commutator of said motor, a source of current supply for said motor, a lever for controlling the supply of current thereto, an indication mechanism for the lever comprising a latch and electro-magnetic means for operating said latch, and said electro-magnetic means comprising a rotating part which upon rotation operates the latch, and a source of current supply for said electro-magnetic means.

4. In combination with an apparatus for moving a part or appliance controlling the passage of cars or vehicles along a railroad, comprising an electric motor, a collector ring insulated therefrom, but electrically connected with a segment of the commutator of said motor, a lever for controlling the supply of current to said motor, an indication mechanism for the lever comprising a latch, an alternating electro-magnetic means for operating said latch, and said electro-magnetic means comprising a rotating part which upon rotation operates the latch, a source of unidirectional current supply in circuit with both the electric motor and electromagnetic means, and means whereby said unidirectional current is converted into an alternating current for effecting the rotation of the electro-magnetic means.

5. In combination with an apparatus for moving a part or appliance controlling the passage of cars or vehicles along a railroad, comprising an electric motor, a source of current supply therefor, a collector ring insulated from said motor but electrically connected with a segment of the commutator thereof, whereby upon rotation of said motor an undulating or pulsatory current is produced, means for controlling the supply of current to said motor, an indication mechanism in circuit with said motor, comprising a latch, an alternating current electro-magnetic means for operating said latch, and said electro-magnetic means comprising a rotating part which upon rotation operates the latch, and means whereby the current in the motor is converted into an alternating current for effecting the rotation of part of the electro-magnetic means.

6. In combination with an apparatus for moving a part or appliance controlling the passage of cars or vehicles along a railroad, comprising an electric motor, a source of current supply therefor, a collector ring electrically connected with a segment of the commutator of said motor, whereby upon rotation of said motor an undulating or pulsatory current is produced, means for controlling the supply of current to said motor, an indication mechanism in circuit with said motor comprising a latch, an alternating current electro-magnetic means for operating said latch, and said electro-magnetic means comprising a rotating part, and a transformer in circuit with said motor and electro-magnetic means whereby an alternating current is impressed on the electro-magnetic means and rotation given a part thereof.

7. An indicating mechanism for a lever for an interlocking machine comprising a latch, a rotating part operatively connected with the latch and a motor for actuating said rotating part.

8. An indicating mechanism for a lever for an interlocking machine comprising a latch, a centrifuge operatively connected with the latch and a motor for rotating the centrifuge to have it operate the latch.

9. An indicating mechanism for a lever of an interlocking machine, comprising a latch, and electro-magnetic means for moving said latch, said electro-magnetic means comprising a rotating part.

10. An indication mechanism for a lever of an interlocking machine, comprising a latch and electro-magnetic means for moving said latch, said electro-magnetic means being responsive only to alternating currents and comprising a rotating part.

11. An indicating mechanism for a lever of an interlocking machine, comprising a latch, an electric motor having a rotating armature, and means mechanically connecting said latch and armature whereby said latch is lifted by a rotation of said armature.

12. An indicating mechanism for a lever of an interlocking machine, comprising a latch, an alternating current motor, said motor comprising a rotating armature, and means operated upon rotation of the armature for moving said latch.

13. An indication mechanism for a lever of an interlocking machine, comprising a latch, an electric motor, said motor comprising a rotating armature, a centrifuge mounted on the shaft of the armature, and a connection between the centrifuge and latch.

14. An indication mechanism for a lever of an interlocking machine, comprising a latch, an electric motor, said motor comprising a rotating armature, a centrifuge mounted on the shaft of the armature, a connection with said centrifuge forming a support for the latch, whereby on rotation of the motor said latch is operated to release the lever.

15. An indication mechanism for a lever of an interlocking machine, comprising a latch, an electric motor, said motor comprising a rotating armature, a support for said latch, a centrifuge mounted on the shaft of the armature, and connections between the support for latch and the centrifuge, the latter having weights or balls thereon, which on rotation of the motor move outwardly by centrifugal force thereby operating the latch to release the lever.

16. In combination with an apparatus for moving a part or appliance controlling the passage of cars or vehicles along a railway, comprising an electric motor, a source of unidirectional current for said motor, a circuit including said motor and source of current, a lever for controlling the supply of current to said motor through said circuit to have it operate the apparatus, an indicating mechanism for said lever operable by an alternating current, means in said circuit which after an operation of the apparatus varies the strength of current flowing in said circuit, and means affected by the varying strength of current in said circuit to operate the indicating mechanism.

17. In combination with an apparatus for moving a part or appliance controlling the passage of cars or vehicles along a railway, comprising an electric motor, a source of unidirectional current for said motor, a circuit including said motor and source of current, a lever for controlling the supply of current to said motor through said circuit to have it operate the apparatus, an indicating mechanism for said lever operable by an alternating current, means in said circuit which after an operation of the apparatus periodically varies the strength of current flowing in said circuit, and means affected by the varying strength of current in said circuit to operate the indicating mechanism.

18. In combination with an apparatus for moving a part or appliance controlling the passage of cars or vehicles along a railway, comprising an electric motor, a source of unidirectional current for said motor, a circuit including said motor and source of current, a circuit controller for the supply of current, an indicating mechanism operable by an alternating current, means in said circuit which after an operation of the apparatus periodically varies the strength of current flowing in said circuit, and means affected by the varying strength of current in said circuit to produce an alternating current to operate the indicating mechanism.

19. In combination with an apparatus for moving a part or appliance controlling the passage of cars or vehicles along a railway comprising an electric motor, a source of unidirectional current for said motor, a circuit controller for the supply of current to said motor, an indicating mechanism operable by an alternating current, a circuit for the indicating mechanism, means in said circuit comprising a collector ring connected with a segment of the motor armature which after an operation of the apparatus varies the strength of the current flowing in said circuit, and means affected by the varying strength of current in said circuit to produce an alternating current to operate the indicating mechanism.

20. In combination with an apparatus for moving a part or appliance controlling the passage of cars or vehicles along a railway comprising an electric motor, a source of unidirectional current for said motor, a circuit controller for the supply of current, an indicating mechanism operable by an alternating current, primary and secondary circuits, means in said primary circuit which after an operation of the apparatus varies the strength of current flowing in said primary circuit, and a transformer by means of which the variable current in the primary circuit is transformed into an alternating current in the secondary circuit for operating the indicating mechanism.

21. In combination with an apparatus for moving a part or appliance controlling the passage of cars or vehicles along a railway comprising an electric motor, a source of unidirectional current for said motor, a circuit controller for the supply of current, an indicating mechanism operable by an alternating current, primary and secondary circuits, means in said primary circuit comprising a collector ring connected with a segment of the motor armature which after an operation of the apparatus varies the strength of current flowing in said primary circuit, and a transformer by means of which the variable current in the primary circuit is transformed into an alternating current in the secondary circuit for operating the indicating mechanism.

22. In combination with an apparatus for moving a part or appliance controlling the passage of cars or vehicles along a railway, a lever for controlling the operation of said apparatus, an indicating mechanism for said lever operable by an alternating current, an electric motor, a source of unidirectional current for said motor, a circuit including said motor and source of current and controlled by said lever, and means in said circuit for varying its strength upon each rotation of the armature, and means affected by the varying strength of current in said circuit to produce an alternating current to operate the indicating mechanism.

23. In combination with an apparatus comprising a motor for moving a part or appliance controlling the passage of cars or vehicles along a railway, a source of unidirectional current for said motor, a circuit controller for the supply of current, an indicating mechanism, a circuit for said indicating mechanism, means included in said circuit for regularly varying the current flow in said circuit, and means effected by the varying current flow for causing an operation of the indicating mechanism.

24. The combination with a lever of an interlocking machine, the said lever having preliminary and final movements, of an indicating mechanism operable by alternating current, a source of direct current, a circuit established by the preliminary movement of said lever, means in said circuit whereby direct current is converted into alternating current for operating the indicating mechanism, and a circuit established by the final movement of said lever whereby direct current is caused to flow through the indicating mechanism for stopping its motion.

25. In an apparatus for controlling the movement of cars or vehicles on a railway, the combination of a switch operating motor, a source of unidirectional current supply, an indicating mechanism comprising a motor having a rotating part, means for converting the unidirectional current into a regularly undulating current, and means for converting the regularly undulating current into a current for producing a rotation of the rotating part of the motor.

26. In an apparatus for controlling the movement of cars or vehicles on a railway, the combination of a switch operating motor, a source of unidirectional current supply, and indicating means comprising a motor having a rotating part, means operated by the switch operating motor for converting the unidirectional current into a regularly undulating current, and means for converting the regularly undulating current into a current for producing rotation of the rotating part of the motor.

27. An apparatus for moving a part or appliance for controlling the passage of cars or vehicles along a railway, which includes an electric motor, a mechanism for indicating that the apparatus has operated, comprising a magnet which is not responsive to the current to the motor, a source of current supply common to both the motor and indicating mechanisms, and means for changing or modifying the character of the current to have it operate the magnet.

28. An apparatus for moving a part or appliance for controlling the passage of cars or vehicles along a railway which includes an electric motor, a mechanism for indicating that the apparatus has operated comprising a magnet which is not responsive to the current to the motor, a source of current supply common to both, a controller for controlling the supply of current, and means for changing the character of the current to have it operate the magnet.

29. An apparatus for moving a part or appliance for controlling the passage of cars or vehicles along a railroad which includes an electric motor, a mechanism for indicating the apparatus has operated, comprising a magnet which is not responsive to the current to the motor, a source of current supply common to both the motor and magnet, a controller for controlling the current supply, a locking provision for said controller, and means for changing the character of the current to have it operate the magnet and release the locking provision whereby the circuits may be changed.

30. An apparatus for moving a part or appliance for controlling the passage of cars or vehicles along a railway, which includes an electric motor, a lever, a mechanism for indicating that the apparatus has operated, comprising an electro-magnetic device which is not responsive to the current to the motor to release the lever, a source of current supply common to both the motor and indicating mechanisms, and means for changing or modifying the character of the current to have it operate the electro-magnetic device.

31. An apparatus for moving a part or appliance for controlling the passage of cars or vehicles along a railway which includes an electric motor, a lever, a mechanism for indicating that the apparatus has operated comprising an electro-magnetic device which is not responsive to the current to the motor to release the lever, a source of current supply common to both, a controller for controlling the supply of current, and means for changing the character of the current to have it operate the electro-magnetic device.

32. An apparatus for moving a part or appliance for controlling the passage of cars or vehicles along a railroad which includes an electric motor, a mechanism for indicating the apparatus has operated, comprising an electro-magnetic device which is not responsive to the current to the motor, a source of current supply common to both the motor and electro-magnetic device, a controller for controlling the current supply, a locking provision for said controller, and means for changing the character of the current to have it operate the electro-magnetic device and release the locking provision whereby the circuits are changed.

In testimony whereof I have signed my name to this specification in the presence of two subscribed witnesses.

JOHN D. TAYLOR.

Witnesses:
  W. L. McDaniel,
  James Chalmers, Jr.